US012794967B2

(12) United States Patent
Khan et al.

(10) Patent No.: US 12,794,967 B2
(45) Date of Patent: *Nov. 10, 2026

(54) SYSTEM FOR CONTROL AND USE OF CLUSTER RESOURCES

(71) Applicant: COREDGE.IO, INDIA PRIVATE LIMITED, Noida (IN)

(72) Inventors: Arif Mohammad Khan, Ghaziabad (IN); Abhimanyu Bhatter, Noida (IN); Ashok Kumar, Noida (IN)

(73) Assignee: COREDGE.IO, INDIA PRIVATE LIMITED, Noida (IN)

( * ) Notice: Subject to any disclaimer, the term of this patent is extended or adjusted under 35 U.S.C. 154(b) by 46 days.

This patent is subject to a terminal disclaimer.

(21) Appl. No.: 18/942,160

(22) Filed: Nov. 8, 2024

(65) Prior Publication Data

US 2025/0071168 A1 Feb. 27, 2025

Related U.S. Application Data

(63) Continuation of application No. 18/263,504, filed as application No. PCT/US2022/071904 on Apr. 25, 2022, now Pat. No. 12,166,810.

(Continued)

(30) Foreign Application Priority Data

Apr. 28, 2021 (IN) ............................. 202111019454

(51) Int. Cl.

| | |
|---|---|
| ***G06F 15/16*** | (2006.01) |
| ***G06F 9/50*** | (2006.01) |
| ***H04L 67/025*** | (2022.01) |

(52) U.S. Cl.

CPC .......... *H04L 67/025* (2013.01); *G06F 9/5077* (2013.01)

(58) Field of Classification Search

CPC ............................. G06F 9/5077; H04L 67/025

(Continued)

(56) References Cited

U.S. PATENT DOCUMENTS

| | | | | |
|---|---|---|---|---|
| 10,069,710 | B2 * | 9/2018 | Boyapalle | H04L 67/1001 |
| 11,245,538 | B2 * | 2/2022 | Doshi | G06F 11/3433 |

(Continued)

OTHER PUBLICATIONS

Gupta, Vikas, "India Patent Office Examination Report dated Jun. 3, 2026", IPO Application Number 202111019454, India Patent Office, Jun. 3, 2026.

*Primary Examiner* — Moustafa M Meky

(74) *Attorney, Agent, or Firm* — Lindauer Law, PLLC

(57) ABSTRACT

Resources associated with a network are administered using a control plane that issues commands to those resources. A command sent to cause a resource to perform a function may specify a target state for the resource. The command may be modified, or an alternate command may be generated, based on the characteristics of the resource, which may enable a single command to be used to cause multiple resources to perform a function. Based on the characteristics of the resource or of the function, a different target state, and in some cases intermediate states that may occur before the target state, may be determined. Telemetry data for a resource may be used to determine the current state of the resource, which is compared to the valid intermediate and target states. Output indicating the states of the resources as valid or erroneous is generated.

20 Claims, 5 Drawing Sheets

Related U.S. Application Data

(60) Provisional application No. 63/202,482, filed on Jun. 14, 2021.

(58) Field of Classification Search
USPC .................................. 709/200–203, 217–226
See application file for complete search history.

(56) References Cited

U.S. PATENT DOCUMENTS

| | | | | |
|---|---|---|---|---|
| 11,632,360 | B1 * | 4/2023 | Tan | G06F 3/0622 726/4 |
| 11,669,386 | B1 * | 6/2023 | Abrol | G06F 11/1076 714/15 |
| 11,990,031 | B2 * | 5/2024 | Guzik | H04L 65/765 |
| 12,047,405 | B2 * | 7/2024 | Hsu | H04L 63/1433 |
| 12,099,427 | B2 * | 9/2024 | Kommula | H04L 41/0609 |
| 12,112,201 | B2 * | 10/2024 | Doshi | G06F 11/3433 |
| 12,166,810 | B2 * | 12/2024 | Khan | H04L 67/025 |
| 12,224,916 | B2 * | 2/2025 | Neogi | H04L 41/16 |
| 12,373,322 | B2 * | 7/2025 | Kommula | G06N 5/046 |
| 12,432,286 | B1 * | 9/2025 | Cannata | H04L 49/35 |
| 12,476,894 | B2 * | 11/2025 | Gafni | H04L 43/55 |
| 12,519,689 | B2 * | 1/2026 | Bhodia | G06F 13/20 |
| 2005/0002055 | A1 * | 1/2005 | Narita | H04L 67/06 358/1.14 |
| 2007/0067318 | A1 | 3/2007 | Wolafka et al. | |
| 2017/0257303 | A1 * | 9/2017 | Boyapalle | H04L 67/34 |
| 2019/0281132 | A1 | 9/2019 | Sethuraman et al. | |
| 2020/0136994 | A1 * | 4/2020 | Doshi | G06F 11/3433 |
| 2022/0172604 | A1 * | 6/2022 | Guzik | H04L 67/12 |
| 2022/0209971 | A1 * | 6/2022 | Doshi | G06F 11/3433 |
| 2023/0035142 | A1 * | 2/2023 | Macnamara | G06F 9/505 |
| 2023/0336447 | A1 * | 10/2023 | Kommula | H04L 41/0681 |
| 2024/0073118 | A1 * | 2/2024 | Gafni | H04L 43/55 |
| 2025/0013929 | A1 * | 1/2025 | Samanta | G06N 20/10 |
| 2025/0021500 | A1 * | 1/2025 | Bhodia | G06F 13/20 |

* cited by examiner

SYSTEM FOR CONTROL AND USE OF CLUSTER RESOURCES

PRIORITY

This application is a continuation of and claims priority to U.S. patent application Ser. No. 18/263,504, filed 28 Jul. 2023, titled "System for Control and Orchestration of Cluster Resources", the contents of which are incorporated herein by reference.

Application Ser. No. 18/263,504, claims priority to PCT Application Serial No. PCT/US22/71904, filed 25 Apr. 2022, titled "System for Control and Orchestration of Cluster Resources", the contents of which are incorporated herein by reference.

PCT Application Serial No. PCT/US22/71904 claims priority to Indian patent Application Serial No. 202111019454, filed 25 Apr. 2022, titled "System for Control and Orchestration of Cluster Resources", the contents of which are incorporated herein by reference.

PCT Application Serial No. PCT/US2022/71904 claims priority to U.S. Patent Application Ser. No. 63/202,482, filed 14 Jun. 2021, titled "System for Edge Compute Resource Management", the contents of which are incorporated herein by reference.

BACKGROUND

Many services will access resources that are remote from the service to perform various operations. For example, resources may include computing devices that are deployed close to the geographic locations of end users, colloquially termed "edge devices", which may be controlled using commands from a service to provide functionality to the end users. However, the different characteristics of various resources, which in some cases may be owned and operated by different entities, may create difficulty when attempting to send commands to multiple resources. Additionally, the performance of certain types of functions, such as rebooting or restarting of resources, may be difficult to control from a remote location.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
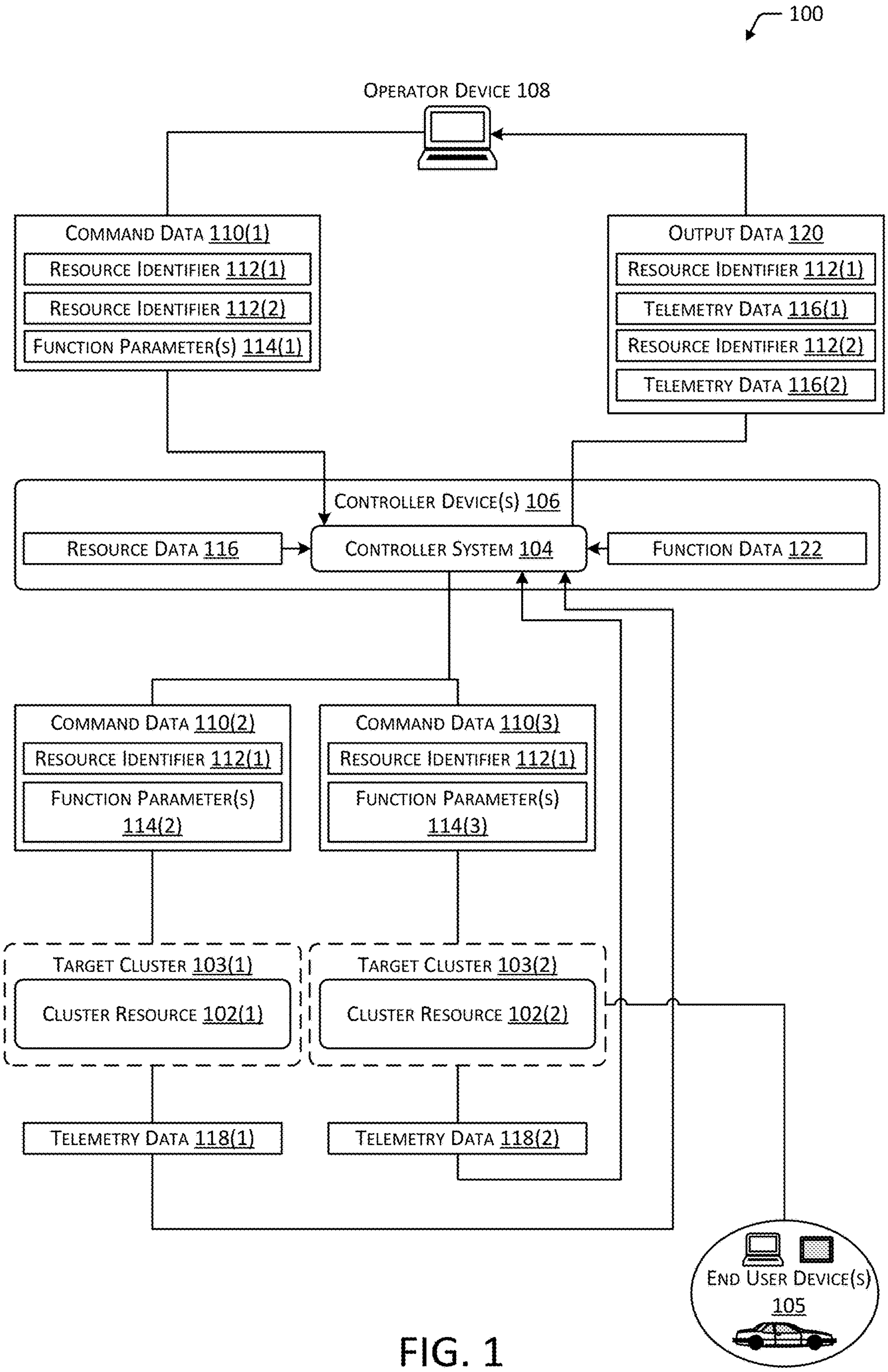
FIG. 1 is a diagram depicting an implementation of a system for providing commands to multiple cluster resources based on the characteristics of the cluster resources, and determining output based on the functions performed by the cluster resources.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many types of computer-based services use resources associated with target clusters of computing devices ("cluster resources") to provide functionality to users. A cluster resource may include a computational resource, computing device or other controllable device having a processor, microcontroller, or other type of controller. A cluster resource may also include a network resource, such as a router, traffic shaper, proxy server, caching server, and so forth. A cluster source may further include a data storage resource, such as network-attached storage, a data store, a storage server, and so forth. A cluster resource may additionally include an infrastructure resource, such as a power management system, climate control system, cooling system, fire suppression system, and so forth. To avoid transmission of large quantities of data across great distances, clusters of resources at or near the locations of end users (e.g., "edge devices" located at the "edge" rather than the "core" of the network) may be used to perform at least a portion of the operations associated with a service. Cluster resources may be associated with an infrastructure system or service that may be used to control or manage operation of the cluster resources, exchange data with the cluster resources, and so forth. Use of target clusters of edge devices to perform a portion of the operations associated with a service may reduce network latency experienced by end users, reduce the amount of data exchanged with a centralized location such as a core datacenter, reduce the reliance on processing of data by devices at a centralized location closer to the core of the network, and provide redundancy by allowing one of the edge device or the centralized device to continue operation when the other device fails or loses connectivity.

A potentially large number of cluster resources spanning many geographic locations may be accessed to provide functionality associated with a service. In many cases, clusters that include different cluster resources may have different characteristics, such as different infrastructure systems or services. Cluster resources may also have different characteristics, such as different hardware components, different operating systems or software components such as applications, and so forth. In some cases, different clusters or cluster resources may be owned, managed, or at least partially controlled by different entities. Due to these factors, different actions may be used to access different cluster resources, certain cluster resources may be incapable of or unavailable to perform certain types of functions, and so forth.

Management and orchestration ("MAO") systems, or other types of infrastructure systems or services, may be used to facilitate operations that use distributed cluster resources. One MAO system is Kubernetes as promulgated by the Cloud Native Computing Foundation at "cncf.io". Kubernetes allows for automated software deployment and management. Other distributions of Kubernetes include OpenShift promulgated by Red Hat, Inc., which may be used to provide management and orchestration. Other systems such as Docker Swarm as promulgated by Docker, Inc. may also provide at least some management and orchestration functionality.

Many existing MAO systems are limited when interacting with cluster resources. For example, clusters and cluster resources may include many different types of applications and infrastructures, each having a particular set of rules and requirements to use the resource. Additionally, many existing systems may be used to maintain a particular state of a cluster resource but are not usable to cause the resource to perform certain types of actions, such as a reboot or restart operation, if the actions are not tied to particular states. For example, a resource that is rebooting or restarting is not in a desired or target state, such as an active, available, or running state.

Described in this disclosure are techniques for enabling a system to interact with multiple target clusters, which may include cluster resources that have differing characteristics, so that commands input to the system may be used by multiple different types of cluster resources. The system may also be used to cause cluster resources to perform functions associated with multiple different states of the resource, including intermediate states before a desired target or end state is attained.

To cause one or more cluster resources to perform a function, the system may determine command data from user input, or from input from one or more services, systems, or computing devices. The command data may specify one or more target clusters or cluster resources, such as by indicating an identifier of the target cluster(s) or of one or more cluster resources associated with a cluster. The command data may also specify a function to be performed by the cluster resource(s). For example, a function may include execution of an application, performance of an operation associated with the application, acquisition of telemetry data or other types of data, transmission of acquired data to the system, restarting one or more components of the cluster resource, and so forth. In some cases, the command data may specify a target state to be attained by a cluster resource, and an infrastructure system may cause the cluster resource to perform actions to reach the target state.

Command data may indicate one or multiple target clusters or cluster resources. Each cluster resource may be associated with a particular set of characteristics, such as a resource type, hardware or software components of the resource, a current status of the resource or of one or more components of the resource, and so forth. In some cases, characteristics of a resource may include a cluster associated with the resource, an entity that owns, operates, or controls the cluster or resource, and particular rules, requirements, or configurations for accessing and using the cluster or cluster resource, particular functions that may be permitted or not permitted by a resource, and so forth. To enable command data to be processed by a cluster resource, the system may determine the characteristics of the indicated cluster resource(s). For example, the system may store or access resource data that indicates the characteristics of at least a portion of the cluster resources accessible to the system. In other cases, the system may access target clusters associated with the resource(s) to determine characteristics of the resources, such as by providing a request or other data. Based on the characteristics of a particular resource and the initial command data, the system may determine alternate command data that may be processed by the particular resource to cause performance of the function. In cases where command data specifies multiple clusters or cluster resources, multiple alternate command data may be determined, each alternate command data based on the characteristics of a particular resource and configured to cause the particular resource to perform the function. For example, alternate command data may include calls, commands, formatting, computer languages, or other characteristics that correspond to the characteristics or rules associated with a particular resource.

A function indicated in the command data may be associated with a particular target state for a cluster resource. For example, causing a cluster resource to perform an operation associated with an application may cause the state of the cluster resource to transition from "idle" to "active". In such a case, the target state indicated by the command data may include the state of "active", and a successful interaction with the cluster resource may be determined based on telemetry data from the cluster resource that indicates the state of "active". As another example, a command may be used to reboot or restart a cluster resource. To perform a reboot or restart operation, the resource may transition from a state of "active" to an intermediate state of "rebooting", then to a target state of "active" after a rebooting process has been completed. In such a case, a command that specifies the target state of "active" would be ineffective, because the cluster resource would be in the target state when the command is received. However, a command that specifies the target state of "rebooting" would be ineffective, because each time the target state of "active" was attained by the resource after completing a reboot or restart process, the reboot or restart process may be repeated to return the resource to the target state of "rebooting".

To enable a function associated with a temporary target state (e.g., a state that is expected or intended to change without providing an additional command to the cluster resource) to be performed by a cluster resource, command data may initially specify a first target state. The system may then determine an alternate target state that corresponds to the function or to the first target state. For example, a command associated with a rebooting function may specify a target state of "rebooting", and an alternate target state of "active" for the rebooting function may be determined. In some cases, the system may determine one or more intermediate states associated with the function or the first target state. For example, the command data may specify an initial target state of "rebooting", and the system may determine an alternate target state of "active" and an intermediate state of "initializing device components". Continuing the example, the system may access function data associated with the function to be performed, and the function data may specify a second target state based on the function or based on the first target state of the function, and may specify valid intermediate states based on the function or on the first target state.

Telemetry data that indicates the state of the cluster resource may be received from the resource after providing the command data. The telemetry data may be compared to the determined target state, and in some cases the determined intermediate state(s), to determine whether the cluster resource has attained a valid state associated with the function. In some implementations, the intermediate state(s) associated with the function may have a sequential or hierarchical relationship. For example, receipt of a command to initiate a restart or reboot operation may cause a cluster resource to transition from an "active" state to a "restarting" state. The "restarting" state may be indicated as a valid intermediate state for a restart function. Once the "restarting" state is determined, the target state for the function may be changed to the "active" state for the resource. The resource may then transition to an "initiating device components" state. This state may not be a valid intermediate state following the "active" state, but may be a valid intermediate state following the "restarting" state. For example, the last determined state of a cluster resource may be used to determine a specific state or set of valid target states or intermediate states that may follow the last determined state. The resource may then transition to the "active" state, and successful completion of the restart function may be determined based on the telemetry data. In cases where a valid intermediate state is determined, the system may permit the resource to continue performing the operation without providing a subsequent command. In cases where an invalid intermediate state is determined, the system may generate output indicative of an error, cause the resource to restart the function, cause the resource to revert to its original state, or perform other corrective actions.

In some cases, different entities may be permitted to access certain clusters or different cluster resources, but may be prevented from access to other clusters or cluster resources. Additionally, in some cases, different entities may be permitted to cause a resource to perform certain functions but may be prevented from causing the resource to perform other functions. When command data is received, a source associated with the command data may be determined, and permission data associated with the source may be accessed. For example, the source may provide, or the system may store, a token or other type of data that indicates one or more clusters, one or more cluster resources, one or more functions, or a combination of clusters, cluster resource(s), or function(s). If the cluster(s), cluster resource(s), and function(s) indicated in the command data correspond to those indicated in the permission data, the command data may be used to cause the cluster resource(s) to perform the indicated function(s).

FIG. 1 is a diagram 100 depicting an implementation of a system for providing commands to multiple cluster resources 102 based on the characteristics of the cluster resources 102, and determining output based on the functions performed by the cluster resources 102. A controller system 104 may be used to provide commands to various cluster resources 102 and receive data from the cluster resources 102. In some cases, one or more other computing devices may provide commands to the controller system 104, which may in turn provide commands to the cluster resource(s) 102, and the controller system 104 may receive data from the cluster resources 102, which may be provided to the other computing device(s).

For example, the controller system 104 may execute on one or more controller devices 106, which may include one or more servers, personal computing devices, portable computing devices, or other types of computing devices. In some implementations, the controller system 104 may include an MAO system. For example, in a Kubernetes system, the controller system 104 may operate as a Kubernetes master, providing control plane functionality. An operator device 108 may be used to interact with the controller system 104. For example, the operator device 108 may include a personal computing device or a portable computing device, such as a desktop computer, laptop computer, tablet computer, and so forth, and an operator, such as a developer or administrator, may use the operator device 108 to send commands to the controller system 104, present information received from the controller system 104, and so forth. In other implementations, one or more services or computing devices may send commands or other data to the controller system 104 and receive data from the controller system 104, without requiring input from a human operator.

The cluster resources 102 may be associated with one or more target clusters 103. Each cluster resource 102 may include one or more computing devices, such as general processing units, graphics processing units, application specific integrated circuits, cryptographic processors, and so forth. Cluster resources 102 may also include network resources, data storage resources, infrastructure resources, and so forth. For example, computing devices associated with the cluster resources 102 may execute various applications, services, and so forth, which may provide services or processing functions to end user devices 105. Continuing the example, an end user device 105 may send data to a module executing on a cluster resource 102 for processing, and the module may return a response to the end user device 105. End user devices 105 may include any type of computing device including, without limitation, workstations or other personal computing devices, tablet computers or other portable computing devices, wearable or embedded devices, vehicle-based computing devices, and so forth. Each target cluster 103 may include one or more cluster resources 102 and may be associated with an infrastructure system or service that may be used to control or manage operation of the cluster resources 102, exchange data with the cluster resources 102, and so forth. Target clusters 103 may be located at different physical locations. For example, the cluster resources 102 associated with different target clusters 103 may be located at different datacenters, businesses, residences, colocation sites, wireless network base stations, vehicles, and so forth. Continuing the example, FIG. 1 depicts a first target cluster 103(1) associated with a first cluster resource 102(1) that may be located at a first geolocation, while a second target cluster 103(2) associated with a second cluster resource 102(2) may be located at a second geolocation. Use of a cluster resource 102 that is geographically close to an end user may enable services to be provided with reduced latency, while reducing the bandwidth and other cluster resources associated with transmission of data and performance of computational processes by devices at other locations. The first target cluster 103(1) may have characteristics that differ from those of the second target cluster 103(2), such as use of different infrastructure systems or other components, different physical locations, and so forth. While FIG. 1 depicts two example target clusters 103, a controller system 104 may communicate with any number of target clusters 103 ranging from a single target cluster 103 to a potentially large number of target clusters 103. The first cluster resource 102(1) may have characteristics that differ from those of the second cluster resource 102(2). For example, the cluster resources 102 may be of different types, may include different hardware or software components, and so forth. While FIG. 1 depicts each target cluster 103 associated with a single example cluster resource 102, a target cluster 103 may be associated with any number of cluster resources.

The controller devices 106 may communicate using one or more networks, which may include public networks such as the Internet, private networks, various network devices such as gateways, and so forth. For example, cluster resources 102 may access various wireless networks, cellular networks, or other types of networks, which may in turn communicate, via the Internet or another public network, with the controller device(s) 106.

The operator device 108 may be used to provide command data 110(1) to the controller system 104. Command data 110(1) may specify one or more cluster resources 102, and a function to be performed by the cluster resource(s) 102. For example, FIG. 1 depicts the operator device 108 providing command data 110(1) that includes a first resource identifier 112(1) indicative of a first target cluster 103(1) or first cluster resource 102(1) and a second resource identifier 112(2) indicative of a second target cluster 103(2) or second cluster resource 102(2). A resource identifier 112 may include a name, network address, or other type of data that may be used to differentiate a particular target cluster 103 or cluster resource 102 from other target clusters 103, cluster resources 102, or computing devices.

The command data 110(1) is also shown including one or more function parameters 114(1). Function parameters 114 (1) may specify a particular action, operation, or function to be performed by a cluster resource 102, such as execution of an application, performance of a function associated with the application, acquisition of data, transmission of data, processing of data, rebooting or restarting of one or more computing devices or components of a computing device, and so forth. In some cases, function parameters 114(1) may specify a particular state for a cluster resource 102. For example, a function to initialize a cluster resource 102, execute an application, or otherwise activate, prepare, or provision the cluster resource 102 may include a function parameter 114(1) that specifies a state of "active" or "running". As another example, a function to initiate a rebooting or restart process for a cluster resource 102 may include a function parameter 114(1) that specifies a state of "rebooting" or "restarting".

As described previously, particular cluster resources 102 may be different types of resources, may be associated with different hardware or software components, may be owned or controlled by different entities, subject to different rules or requirements, capable of performing different functions or attaining different states, and so forth. The controller devices 106 may store or access resource data 116 that associates characteristics of cluster resources 102 with corresponding resource identifiers 112.

Based on the resource data 116 and the command data 110(1) received from the operator device 108, the controller system 104 may determine second command data 110(2) configured for use with a first cluster resource 102(1). For example, the controller system 104 may determine correspondence between the first resource identifier 112(1) indicated in the command data 110(1) and the resource data 116, to determine one or more characteristics of the first cluster resource 102(1). Based on the determined characteristics and the function parameters 114(1) indicated in the command data 110(1), an alternate set of function parameters 114(2) that may be received and processed by the first cluster resource 102(1) and that may cause the first cluster resource 102(1) to perform a function may be generated. Second command data 110(2) that includes these function parameters 114(2) may be provided to the target cluster 103(1) associated with the first cluster resource 102(1).

In a similar manner, based on the resource data 116 and the command data 110(1) received from the operator device 108, the controller system 104 may determine third command data 110(3) configured for use with a second cluster resource 102(2). The second cluster resource 102(2) may have characteristics that differ from those of the first cluster resource 102(1). For example, the second cluster resource 102(2) may include different hardware or software components, may be associated with different operating systems, applications, or rules or requirements associated with an entity. In some cases, the second cluster resource 102(2) may be at a different geographic location than the first cluster resource 102(1), may be accessed using different networks and computing devices, and so forth. The controller system 104 may determine correspondence between the second resource identifier 112(2) indicated in the command data 110(1) and the resource data 116, to determine one or more characteristics of the second cluster resource 102(2). Based on the determined characteristics and the function parameters 114(1) indicated in the command data 110(1), an alternate set of function parameters 114(3) that may be received and processed by the second cluster resource 102(2) and that may cause the second cluster resource 102(2) to perform a function may be generated. Third command data 110(3) that includes the determined function parameters 114(3) may be provided to the second target cluster 103(2) associated with the second cluster resource 102(2).

The first cluster resource 102(1) may perform one or more functions based on the second command data 110(2). In some cases, the first cluster resource 102(1) may generate telemetry data 118(1) that may indicate one or more characteristics of the first cluster resource 102(1), components of the first cluster resource 102(1), functions that are performed, data that is received, generated, processed, or output, and so forth. For example, the second command data 110(2) may specify a target state for the first cluster resource 102(1), and the telemetry data 118(1) may indicate one or more states attained by the first cluster resource 102(1) during performance of a function. The second cluster resource 102(2) may similarly perform one or more functions based on the third command data 110(3) and may generate telemetry data 118(2) indicating characteristics of the second cluster resource 102(2) or functions that are performed. The telemetry data 118(2) may indicate one or more states attained by the second cluster resource 102(2) during performance of a function.

The cluster resource(s) 102 may provide at least a portion of the determined telemetry data 118 to the controller system 104. The controller system 104 may determine output data 120 based at least in part on the telemetry data 118. For example, the telemetry data 118 from a cluster resource 102 may indicate a state associated with the cluster resource 102, and the output data 120 may indicate the state, whether the state indicates successful performance of a function, whether the state indicates a potential error state, and so forth. The controller system 104 may access function data 122 that associates valid states for a cluster resource 102 that indicate proper operation, performance of a function associated with the command data 110(1), and so forth, with function parameters 114 of the function, characteristics of the cluster resource 102, and so forth. For example, correspondence between the function data 122 and received telemetry data 118 may be used to determine successful performance of a function, normal operation of a cluster resource 102, or occurrence of a potential error, which may be indicated in the output data 120.

As shown in FIG. 1, the output data 120 may associate resource identifiers 112 for one or more cluster resources 102 that were caused to perform a function with at least a portion of the telemetry data 118 from that cluster resource 102, such as a portion of the telemetry data 118 that indicates a state of the cluster resource 102. In some implementations, the output data 120 may indicate whether the determined state of a cluster resource 102 indicates normal operation, performance of a function, or occurrence of a potential error. Specifically, FIG. 1 depicts the output data 120 associating a first resource identifier 112(1) indicative of the first cluster resource 102(1) with at least a portion of first telemetry data 118(1) received from the first cluster resource 102(1), and a second resource identifier 112(2) indicative of the second cluster resource 102(2) with at least a portion of the second telemetry data 118(2) received from the second cluster resource 102(2). At least a portion of the output data 120 may be provided to the operator device 108, such as to cause presentation of information based on the output data 120.

Figure 2A:
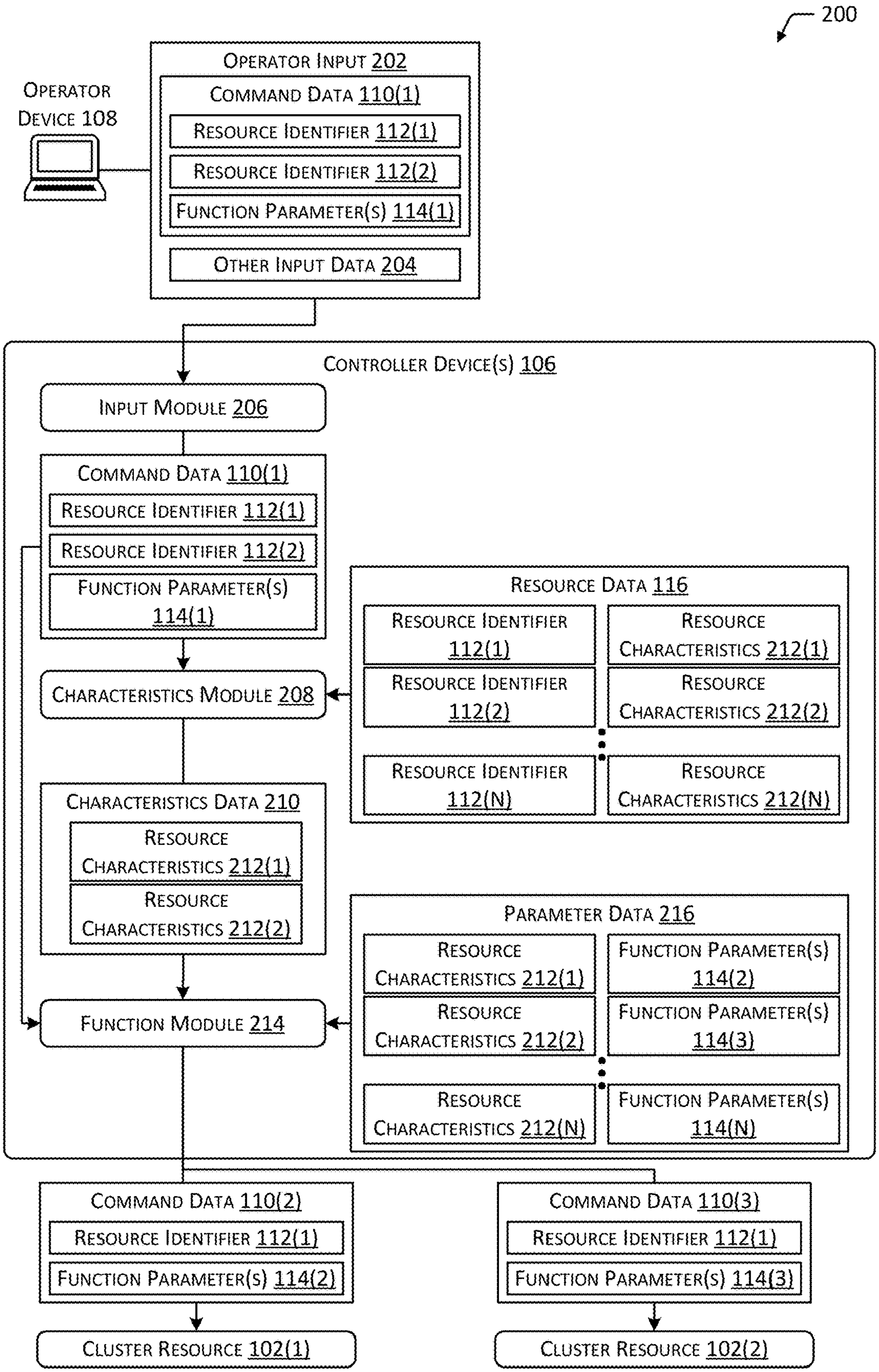
FIG. 2A is a diagram depicting an implementation of a system for determining command data suitable for use with particular cluster resources based on the characteristics of the cluster resources.

FIG. 2A is a diagram 200 depicting an implementation of a system for determining command data 110 suitable for use with particular cluster resources 102 based on the characteristics of the cluster resources 102. As described with regard to FIG. 1, a controller system 104 executing on one or more controller devices 106 may determine first command data 110(1) based on input received from an operator device 108, determine characteristics of one or more cluster resources 102 based on resource data 116, and may generate alternate command data 110 suitable for receipt and processing by particular target clusters 103 of cluster resources 102 based on the received command data 110(1) and determined characteristics.

An operator device 108 may provide operator input 202 to the controller device(s) 106. In some cases, operator input 202 may be provided by a human operator, such as through use of one or more input devices associated with the operator device 108. In other cases, operator input 202 may be provided by a service, application, computing device, or other automated mechanism independent of user input provided by a human. The operator input 202 may include first command data 110(1), which may specify one or more cluster resources 102 or target clusters 103 using resource identifiers 112 and may specify characteristics of a function to be performed using one or more function parameters 114(1), such as a target state to which a cluster resource 102 is to be transitioned. In some cases, the operator input 202 may include other input data 204, such as data indicative of the operator device 108, a user account associated with an operator, tokens or other credentials indicating access or permissions to interact with the controller system 104 or cluster resource(s) 102, and so forth. For example, other input data 204 may include authentication data, cryptographic data, identification data, and so forth.

An input module 206 associated with the controller system 104 may determine the command data 110(1) based on the operator input 202. For example, the input module 206 may be configured to parse or otherwise process commands, input, and so forth, may determine portions of the operator input 202 that include command data 110(1), or may generate command data 110(1) based on other information in the operator input 202. For example, the operator input 202 may specify locations or other characteristics of target clusters 103 or cluster resources 102, and the input module 206 may determine resource identifiers 112 for the target clusters 103 or cluster resources 102 that include the specified characteristics. As another example, the operator input 202 may specify characteristics of a function to be performed, and the input module 206 may determine function parameters 114(1) based on the information included in the operator input 202.

A characteristics module 208 associated with the controller system 104 may determine characteristics data 210 indicative of the characteristics of the cluster resources 102 indicated in the command data 110(1) or determined based on the command data 110(1). For example, the characteristics module 208 may determine correspondence between the resource identifiers 112 indicated in the command data 110(1) and resource data 116 that associates the resource identifiers 112 for one or more target clusters 103 or cluster resources 102 with corresponding sets of resource characteristics 212 of the cluster resource(s) 102. Continuing the example, FIG. 2A depicts the resource data 116 indicating first resource characteristics 212(1) that are associated with the first resource identifier 112(1) for the first cluster resource 102(1), second resource characteristics 212(2) associated with the second resource identifier 112(2) for the second cluster resource 102(2), and any number of additional resource characteristics 212(N) associated with any number of additional resource identifiers 112(N). Based on the correspondence between the command data 110(1) and the resource data 116, characteristics data 210 that indicates the characteristics of the cluster resources 102 indicated in the command data 110(1) may be determined.

A function module 214 associated with the controller system 104 may determine alternate command data 110 that may cause particular cluster resources 102 to perform one or more functions. For example, the command data 110(1) determined based on the operator input 202 may indicate one or more first function parameters 114(1). The function parameters 114(1) may indicate a target state for a cluster resource 102, particular components of the cluster resource 102 to be used, particular actions to performed using a cluster resource 102, and so forth. Because each cluster resource 102 may be associated with particular resource characteristics 212, command data 110 having different contents, formats, function parameters 114, and so forth that are based on the resource characteristics 212 may be used to cause the cluster resource 102 to perform a function. For example, the command data 110(1) determined based on the operator input 202 may be unsuitable for receipt or processing by a particular cluster resource 102, but alternate command data 110 determined using the controller system 104 may be received and processed by the cluster resource 102 and may cause the cluster resource 102 to perform a function.

In some implementations, the function module 214 may access parameter data 216 that associates resource characteristics 212 with corresponding function parameters 114. For example, FIG. 2A depicts the parameter data 216 associating the first resource characteristics 212(1) of the first cluster resource 102(1) with a second set of function parameters 114(2) that may differ from the function parameters 114(1) indicated in the command data 110(1). The parameter data 216 is also depicted associating the second resource characteristics 212(2) of the second cluster resource 102(2) with a third set of function parameters 114(3), and any number of additional resource characteristics 212(N) with corresponding function parameters 114(N). Based on correspondence between the parameter data 216 and the characteristics data 210, the function module 214 may determine second command data 110(2) for use with the first cluster resource 102(1) that includes the second function parameters 114(2), and third command data 110(3) for use with the second cluster resource 102(2) that includes the third function parameters 114(3). As a result, a single command data 110(1) determined based on operator input 202 received from the operator device 108 may be used to cause one or multiple cluster resources 102 to perform a function independent of the particular resource characteristics 212 of the cluster resource(s) 102.

Figure 2B:
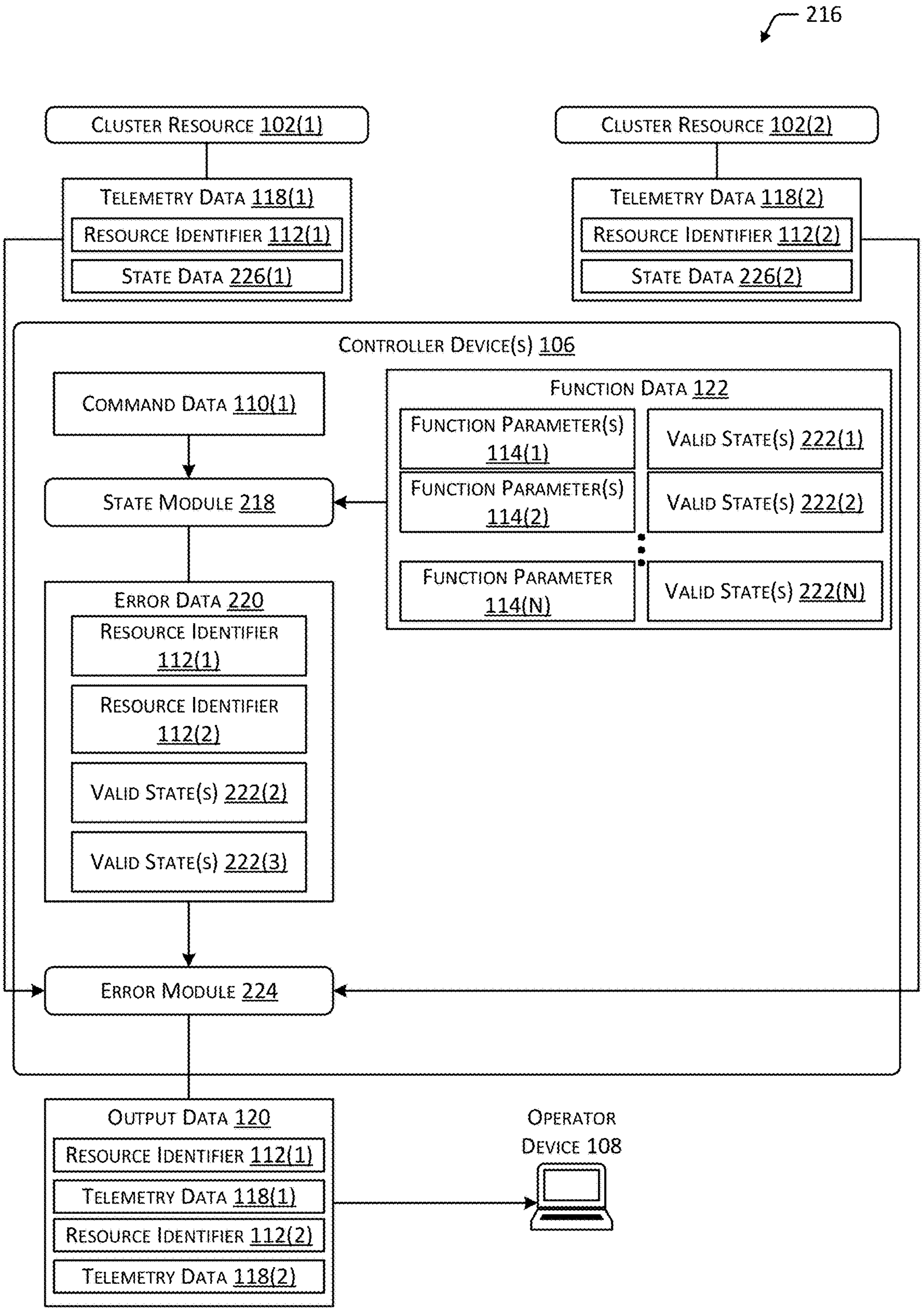
FIG. 2B is a diagram depicting an implementation of a system for determining states associated with performance of a function by cluster resources and whether the determined states indicate a potential error.

FIG. 2B is a diagram 216 depicting an implementation of a system for determining states associated with performance of a function by cluster resources 102 and whether the determined states indicate a potential error. As described with regard to FIG. 1, telemetry data 118 may be determined from cluster resources 102. The telemetry data 118 may indicate one or more characteristics of the cluster resource 102, hardware or software components of the cluster resource 102, functions performed by the cluster resource 102, data that is received, generated, processed, or output by the cluster resource 102, and so forth. In some implementations, telemetry data 118 may indicate one or more states attained by a cluster resource 102. The particular states for a cluster resource 102 that indicate normal operation of the cluster resource 102, successful performance of a function, and the absence of a potential error may be determined based on characteristics of the function that is performed.

The second cluster resource 102(2) may similarly perform one or more functions based on the third command data 110(3) and may generate telemetry data 118(2) indicating characteristics of the second cluster resource 102(2) or functions that are performed. The telemetry data 118(2) may indicate one or more states attained by the second cluster resource 102(2) during performance of a function.

A state module 218 associated with the controller system 104 may determine error data 220 indicative of valid states 222 associated with performance of a function. Continuing the example, the state module 218 may access function data 122 that associates function parameters 114 for a function with valid states 222 of a cluster resource 102 associated with performance of the function. FIG. 2B depicts the function data 122 associating first function parameters 114(1) that may be associated with a first function with one or more first valid states 222(1) of a cluster resource 102. The function data 122 is also depicted associating second function parameters 114(2) with second valid states 222(2), and any number of additional function parameters 114(N) with corresponding valid states 222(N). In some implementations, the function data 122 may also associate valid states 222 with resource characteristics 212 of cluster resources 102. For example, particular states may be valid for certain cluster resources 102 but may not be applicable for other cluster resources 102.

The state module 218 may determine the error data 220 based on correspondence between the command data 110(1) determined based on input from the operator device 108 and the function data 122, and in some implementations, correspondence between the characteristics data 210 and the function data 122 may also be used to determine the error data 220. FIG. 2B depicts the error data 220 indicating valid states 222(2) that correspond to the second set of function parameters 114(2) indicated in the second command data 110(2) for first cluster resource 102(1). FIG. 2B also depicts the error data 220 indicating valid states 222(3) that correspond to the third set of function parameters 114(3) indicated in the third command data 110(3) for the second cluster resource 102(2).

Valid states 222 for a cluster resource 102 may include target states or end states following performance of a function. In some cases, valid states 222 may also include intermediate states that a cluster resource 102 may attain during performance of the function. For example, a cluster resource 102 may initially have a state of "active". The command data 110(1) from the operator device 108 may be used to cause the cluster resource 102 to perform a restart or reboot operation. The function parameters 114(1) of the command data 110(1) may indicate a target state of "restarting". However, after the restart operation has been initiated and the cluster resource 102 has attained the state of "restarting", the cluster resource 102 may transition to one or more other states. While these other states may differ form the state of "restarting" specified in the command data 110(1), the other states may be associated with an expected transition rather than a potential error. For example, after a cluster resource 102 has completed a reboot or restart operation, the state of the cluster resource 102 may transition from "restarting" to "active". Therefore, the function data 122 may associate a valid target state of "active" with a reboot or restart operation. In such a case, if the telemetry data 118 from a cluster resource 102 indicates a state of "active", this may be determined as normal operation of the cluster resource 102 and successful performance of a function, rather than a potential error.

In some cases, an operation may be associated with one or more intermediate states. For example, after initiating a reboot or restart operation, a cluster resource 102 may transition from a state of "active" to a state of "restarting". The cluster resource 102 may then transition from the state of "restarting" to the state of "initializing device components". While the cluster resource 102 is associated with the state of "initializing device components", the telemetry data 118 from the cluster resource 102 may indicate that state. Therefore, the function data 122 may associate a valid intermediate state of "initializing device components" with a reboot or restart operation. In such a case, if telemetry data 118 from a cluster resource 102 indicates this state, this may be determined as normal operation of the cluster resource 102 and successful performance of a function, rather than a potential error.

An error module 224 associated with the controller system 104 may determine output data 120 based on the error data 220 and the telemetry data 118 received from the cluster resources 102. For example, at least a portion of the telemetry data 118 for a cluster resource 102 may include state data 226 that indicates a state of the cluster resource 102. The error module 224 may determine correspondence between the telemetry data 118 from a cluster resource 102 and the error data 220 that indicates the valid state(s) 222 for performance of the function by the cluster resource 102. Based on this correspondence, the error module 224 may determine output data 120 indicative of one or more of normal or abnormal operation of the cluster resource 102, successful or failed performance of a function, or the presence or absence of potential errors. The output data 120 may include an indication of this determination, and in some cases may include portions of telemetry data 118 associated with valid or invalid states. For example, FIG. 2B depicts the output data 120 associating the first resource identifier 112(1) with a portion of first telemetry data 118(1) determined from the first cluster resource 102(1), and associating the second resource identifier 112(2) with a portion of second telemetry data 118(2) determined from the second cluster resource 102(2). While FIG. 2B depicts a single determination of error data 220 based on functions performed by cluster resources 102, and a single determination of output data 120 based on the error data 220 and telemetry data 118 from the cluster resources 102, in some implementations, the process described with regard to FIG. 2B may be performed multiple times. For example, when a cluster resource 102 transitions from a first state to a second state, a different set of valid states 222 may be determined based on the second state. When telemetry data 118 indicating a third state is received from the cluster resource 102, the error module 224 may then determine correspondence between the third state and the most recent set of valid states 222. This process may continue until a target or end state of the cluster resource 102 is determined, or until an error state is determined.

Figure 3:
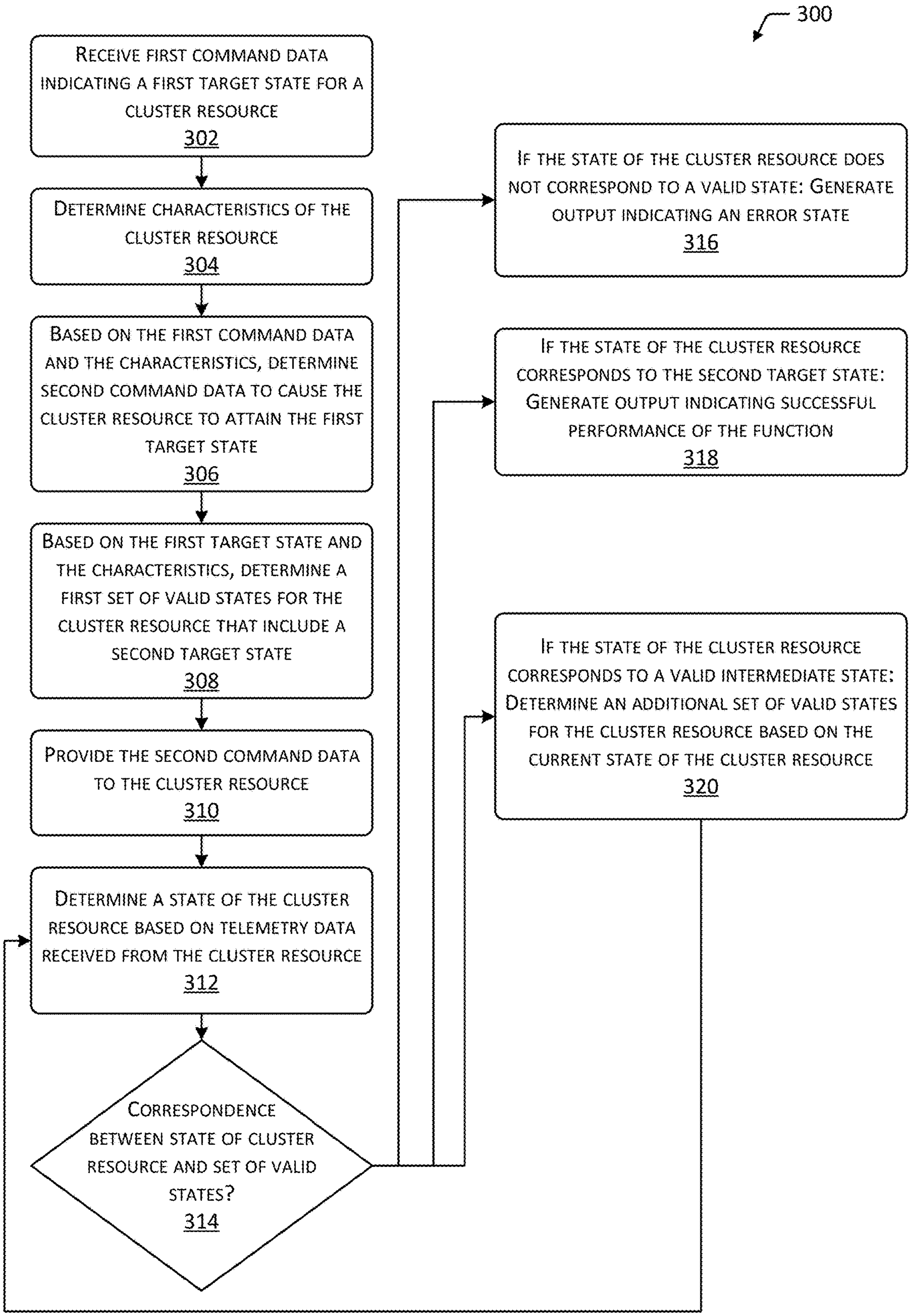
FIG. 3 is a flow diagram depicting an implementation of a process for determining command data to provide to a cluster resource, states of the cluster resource while performing a function, and whether the states indicate a potential error.

FIG. 3 is a flow diagram 300 depicting an implementation of a process for determining command data 110 to provide to a cluster resource 102, states of the cluster resource 102 while performing a function, and whether the states indicate a potential error. At 302, first command data 110(1) may be received. The first command data 110(1) may indicate a first target state for a cluster resource 102. For example, command data 110(1) may be provided from an operator device 108 to a controller system 104 and may include a resource identifier 112 indicative of a cluster resource 102. The command data 110(1) may also indicate one or more function parameters 114(1). The function parameter(s) 114(1) may include a target state for a cluster resource 102. For example, a target state for a function that includes activation of a deactivated or idle cluster resource 102 may include "active", while a target state for initiating a reboot or restart process for a cluster resource 102 may include "rebooting".

At 304, characteristics of the cluster resource 102 indicated in the command data 110(1) may be determined. For example, a cluster resource 102 may include one or more computing devices that have one or more hardware or software components, communicate using certain networks, are owned or controlled by certain entities, are capable of or permitted to perform certain functions, such as processing data having certain characteristics, and so forth. Continuing the example, resource data 116 that associates resource identifiers 112 with corresponding resource characteristics 212 may be used to determine such characteristics of cluster resources 102, which may in turn be used to determine command data 110 that may be used to cause a particular cluster resource 102 to perform one or more functions.

At 306, based on the first command data 110(1) and the determined resource characteristics 212, second command data 110(2) may be determined. The second command data 110(2) may be configured to cause the cluster resource to attain the first target state. For example, the second command data 110(2) may include a format, particular commands or API calls, or other characteristics that are able to be processed by the cluster resource 102, comply with rules associated with an entity that owns or controls the cluster resource 102, and so forth.

At 308, based on the first target state from the first command data 110(1) and the resource characteristics 212 of the cluster resource 102, a first set of valid states 222 for the cluster resource 102 may be determined. The valid states 222 may include a second target state for the cluster resource 102. For example, if the first command data 110(1) is provided to the cluster resource 102 to initiate a reboot or restart operation, the first command data 110(1) may specify a target state of "rebooting", however, the cluster resource 102 may transition from a state of "rebooting" to a final target state of "active". Therefore, a second target state based on the first target state and the characteristics of the cluster resource 102 may be "active". Additionally, the cluster resource 102 may be expected to transition to one or more intermediate states, such as a state of "initializing device components". In some implementations, the determined valid states 222 may include one or more intermediate states in addition to or in place of a second target state.

At 310, the second command data 110(2) may be provided to the cluster resource 102. The second command data 110(2) may include a format, commands, or other data configured to cause the cluster resource 102 to perform a function or transition to the target state indicated in the first command data 110(1), or to a similar or corresponding state.

At 312, a state of the cluster resource 102 may be determined. For example, telemetry data 118 from the cluster resource 102 may be received, and the state of the cluster resource 102 may be indicated in or determined from the telemetry data 118. Continuing the example, as a cluster resource 102 performs a function, the cluster resource 102 may transition from an initial state to one or more intermediate states, then to an end target state. For example, a cluster resource 102 performing a reboot or restart process may initially be in a state of "active", may transition to a state of "rebooting" after processing command data 110(2), may transition to a state of "initializing device components" after attaining the state of "rebooting", and may transition to a final target state of "active" after the state of "initializing device components".

At 314, correspondence between the state of the cluster resource 102 and the set of valid states 222 may be determined. If the state of the cluster resource 102 corresponds to one or more of the valid states 222, this may indicate normal operation, successful performance of a function, and so forth. If the state of the cluster resource 102 does not correspond to one or more of the valid states 222, this may indicate a potential error, failure, or unexpected action. In such a case, output indicative of an error state may be generated, and in some cases, the function may be restarted or the cluster resource 102 may be returned to its initial state. Correspondence between the state of the cluster resource 102 and the set of valid states 222 may include a match between the state of the cluster resource 102 and at least one valid state 222. In other cases, the correspondence may include the state of the cluster resource 102 being within a threshold value or threshold similarity of at least one valid state 222. In still other cases, the correspondence may include the state of the cluster resource 102 being related to one or more of the valid states 222.

At 316, if the state of the cluster resource 102 does not correspond to a valid state 222, output indicating an error state may be generated. The output may indicate a potential error, a failure to perform one or more functions, performance of an unexpected action, and so forth. In some implementations, the cluster resource 102 may be returned to its initial state, the cluster resource 102 may be caused to restart the function, or other corrective actions may be taken.

At 318, if the state of the cluster resource 102 corresponds to the second target state determined at 308, output may be generated indicating successful performance of the function. For example, if the cluster resource 102 attains the expected target state, this may indicate that the function has been performed and the cluster resource 102 operated normally.

At 320, if the state of the cluster resource 102 corresponds to a valid intermediate state 222, an additional set of valid states 222 for the cluster resource 102 may be determined based on the current state of the cluster resource 102. The method may then return to 312 and the current state of the cluster resource 102 may be determined and compared to the additional set of valid states 222. For example, when causing a cluster resource 102 to initiate a restart or reboot process, the state of the cluster resource 102 may transition from “active” to “restarting.” Telemetry data 118 may indicate the state of the cluster resource 102 as “restarting”. An additional set of valid states 222 may then be determined based on the telemetry data 118. For example, a subsequent valid state 222 may include “initializing device components”. This state may be valid after the cluster resource 102 has attained the “restarting” state, but may be unexpected or potentially erroneous if attained at a different time. Therefore, the valid states 222 for a cluster resource 102 may change based on the last state that was determined based on telemetry data 118. If a subsequent state of the cluster resource 102 corresponds to a subsequent valid state 222, the process may continue, and steps 312, 314, and 320 may be repeated one or more times until the cluster resource 102 attains a target state, or a state that does not correspond with a valid state 222.

Figure 4:
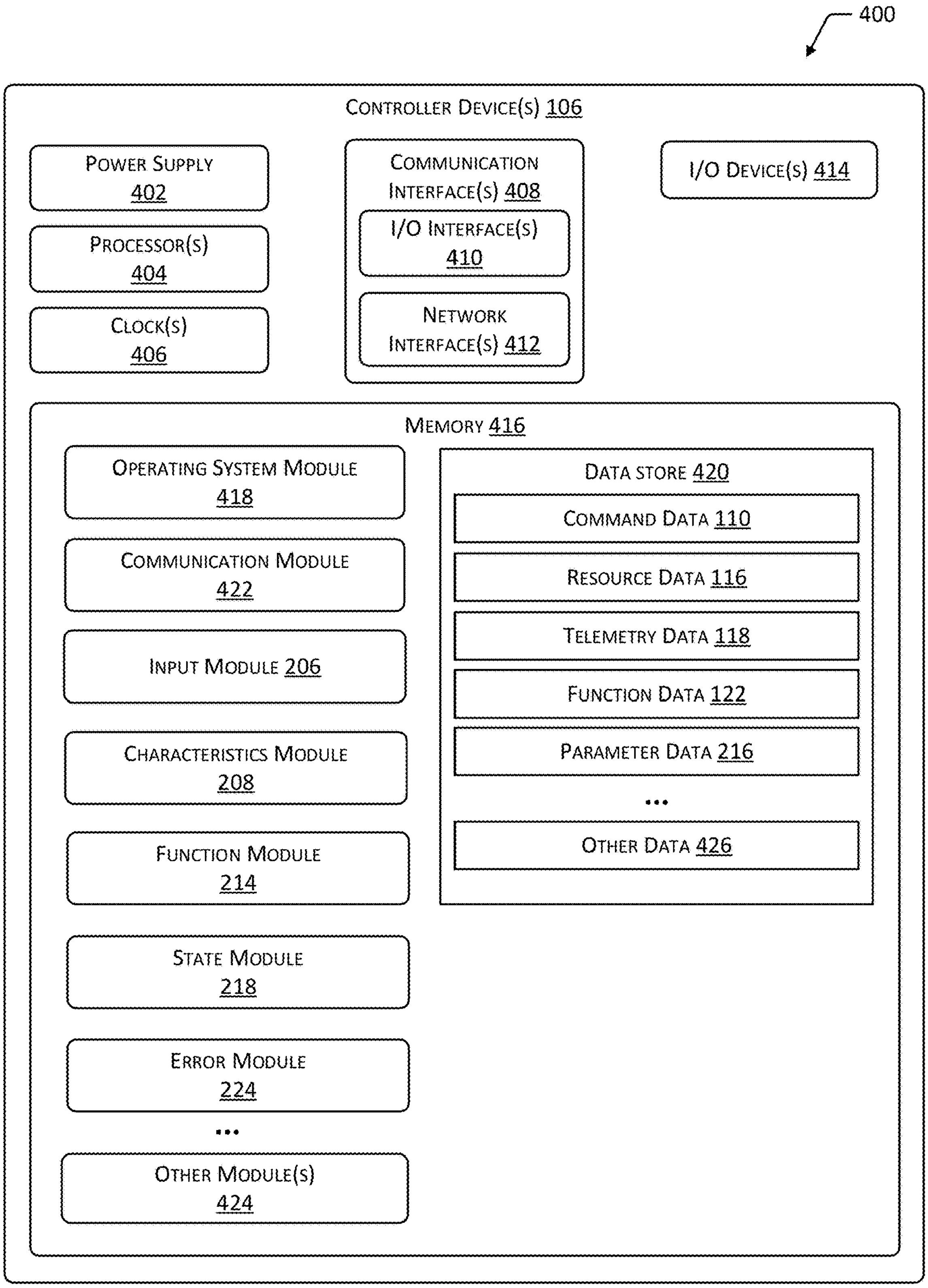
FIG. 4 is a block diagram depicting an implementation of a controller device within the present disclosure.

FIG. 4 is a block diagram 400 depicting an implementation of a controller device 106 within the present disclosure. While FIG. 4 depicts a single block diagram 400, multiple computing devices may be used to perform the functions described herein. For example, the computing device may include one or more controller devices 106, as described with regard to FIGS. 1-3. Additionally, in other implementations, one or more of the functions described herein with regard to the controller device(s) 106 may be performed using one or more operator devices 108, cluster resources 102, or other computing devices in communication with a controller device 106. Therefore, while FIG. 4 depicts an implementation of a controller device 106, any number and any type of computing devices may be used to perform the functions described herein.

One or more power supplies 402 may be configured to provide electrical power suitable for operating the components of the controller device 106. In some implementations, the power supply 402 may include a rechargeable battery, fuel cell, photovoltaic cell, power conditioning circuitry, and so forth.

The controller device 106 may include one or more hardware processor(s) 404 (processors) configured to execute one or more stored instructions. The processor(s) 404 may include one or more cores. One or more clock(s) 406 may provide information indicative of date, time, ticks, and so forth. For example, the processor(s) 404 may use data from the clock 406 to generate a timestamp, trigger a preprogrammed action, and so forth.

The controller device 106 may include one or more communication interfaces 408 that may be used to establish communication links with other computing devices, exchange data, and so forth. For example, the communication interfaces 408 may include input/output (I/O) interfaces 410, network interfaces 412, and so forth. The communication interfaces 408 may enable the controller device 106, or components of the controller device 106, to communicate with other computing devices or components of the other computing devices. The I/O interfaces 410 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include any manner of input devices or output devices. For example, I/O devices 414 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 414 may be physically incorporated with the controller device 106. In other implementations, I/O devices 414 may be externally placed.

The network interfaces 412 may be configured to provide communications between the controller device 106 and other devices, such as the I/O devices 414, routers, access points, and so forth. The network interfaces 412 may include devices configured to couple to one or more networks including local area networks (LANs), wireless LANs (WLANs), wide area networks (WANs), wireless WANs, and so forth. For example, the network interfaces 412 may include devices compatible with Ethernet, Wi-Fi, Bluetooth, ZigBee, Z-Wave, 4G, 5G, LTE, and so forth.

The controller device 106 may include one or more buses or other internal communications hardware or software that allows for the transfer of data between the various modules and components of the controller device 106.

As shown in FIG. 4, the controller device 106 may include one or more memories 416. The memory 416 may include one or more computer-readable storage media (CRSM). The CRSM may be any one or more of an electronic storage medium, a magnetic storage medium, an optical storage medium, a quantum storage medium, a mechanical computer storage medium, and so forth. The memory 416 may provide storage of computer-readable instructions, data structures, program modules, and other data for the operation of the controller device 106. A few example modules are shown stored in the memory 416, although the same functionality may alternatively be implemented in hardware, firmware, or as a system on a chip (SoC).

The memory 416 may include one or more operating system (OS) modules 418. The OS module 418 may be configured to manage hardware resource devices such as the I/O interfaces 410, the network interfaces 412, the I/O devices 414, and to provide various services to applications or modules executing on the processors 406. The OS module 418 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 420 and one or more of the following modules may also be associated with the memory 416. The modules may be executed as foreground applications, background tasks, daemons, and so forth. The data store(s) 420 may use a flat file, database, linked list, tree, executable code, script, or other data structure to store information. In some implementations, the data store(s) 420 or a portion of the data store(s) 420 may be distributed across one or more other devices including other computing devices, network attached storage devices, and so forth.

A communication module 422 may be configured to establish communications with one or more other computing devices. Communications may be authenticated, encrypted, and so forth.

The memory 416 may also store the input module 206. The input module 206 may receive input from other computing devices, such as operator devices 108, and determine command data 110 based on the input. For example, the input module 206 may be configured to parse or otherwise process commands, input, and so forth, and may determine portions of input that include commands. In some implementations, the input module 206 may be configured to generate command data 110 based on other information received via input. For example, input may specify particular characteristics of cluster resources 102, particular functions to be performed, and so forth, and the input module 206 may determine commands to be provided to cluster resources 102 based on this information.

The memory 416 may additionally store the characteristics module 208. The characteristics module 208 may determine characteristics of one or more cluster resources 102 indicated in received command data 110 or determined by the input module 206 in response to received input. For example, the characteristics module 208 may determine correspondence between the resource identifiers 112 indicated in command data 110 and resource data 116 that associates the resource identifiers 112 for one or more cluster resources 102 with corresponding sets of resource characteristics 212 of the cluster resource(s) 102. In other implementations, the characteristics module 208 may determine characteristics of cluster resources 102 by exchanging data with the cluster resources 102, such as by sending a request or other data and receiving data from the cluster resources 102.

The memory 416 may store the function module 214. The function module 214 may determine parameters of a function and command data 110 that includes the determined parameters, to cause a cluster resource 102 to perform a function. For example, different cluster resources 102 may be configured to process different types of data, input, commands, calls, and so forth. In some cases, the function module 214 may access parameter data 216 that associates resource characteristics 212 of cluster resources 102 with function parameters 114 that may differ from the function parameters 114 determined based on the input. Based on correspondence between the parameter data 216 and the characteristics of the cluster resources 102, the function module 214 may determine command data 110 for use with particular cluster resources 102.

The memory 416 may also store the state module 218. The state module 218 may determine valid states 222 associated with a particular function or cluster resource 102, based on the function, a target state for the function, or a previous state attained by the cluster resource 102. In some implementations, the state module 218 may access function data 122 that associates parameters for a function with valid states 222 of the cluster resource 102. In some implementations, function data 122 may associate valid states 222 with resource characteristics 212 of cluster resources 102. The state module 218 may determine the error data 220 indicative if the presence or absence of an error, based on correspondence between the command data 110 determined by the input module 206. Valid states 222 for a cluster resource 102 may include target states or end states following performance of a function. In some cases, valid states 222 may also include intermediate states that a cluster resource 102 may attain during performance of the function. In some cases, valid states 222 may be determined based on a most recent or last-determined state of a cluster resource 102.

The memory 416 may additionally store the error module 224. The error module 224 may receive telemetry data 118 associated with operation of one or more cluster resources 102 and determine output data 120 based on correspondence between states indicated in the telemetry data 118 and valid states 222 determined for the cluster resources 102. Correspondence between the state of the cluster resource 102 and the set of valid states 222 may include a match, being similar within a threshold value or threshold similarity, or being related to one another. In addition to or in place of generating output data 120 indicative of a presence or absence of one or more errors, in some implementations, the error module 224 may cause a cluster resource 102 to restart a function, return to a previous state, and so forth.

Other modules 424 may also be present in the memory 416. For example, other modules 424 may include permission or authorization modules to determine permission data, such as a token, that enables particular devices or accounts to access particular cluster resources 102, cause performance of particular functions, and so forth. Other modules 424 may also include encryption modules to encrypt and decrypt communications between computing devices, authentication modules to authenticate communications sent or received by computing devices, user interface modules to generate interfaces for receiving input from users, and so forth. Other modules 424 may also include modules for generating reports based on telemetry data 118, determining potential errors or other issues based on portions of the telemetry data 118, and so forth. Other modules 424 may additionally include modules for establishing secure communications with cluster resources 102.

Other data 426 within the data store(s) 420 may include configurations, settings, preferences, and default values associated with computing devices. Other data 426 may also include encryption keys and schema, access credentials, and so forth. Other data 426 may also include permission data, such as tokens or other credentials that indicate permission to access particular cluster resources 102, cause performance of particular functions, and so forth.

In different implementations, different computing devices may have different capabilities or capacities. For example, controller devices 106 may have greater processing capabilities or data storage capacity than operator devices 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:

one or more memories storing computer-executable instructions; and one or more hardware processors to execute the computer-executable instructions to:

determine first command data indicative of a function;

determine one or more first characteristics of a first cluster resource;

determine second command data based on the first command data and the one or more first characteristics;

provide the second command data to the first cluster resource, wherein the second command data causes the first cluster resource to perform the function;

receive first telemetry data from the first cluster resource, wherein the first telemetry data indicates one or more second characteristics associated with performance of the function by the first cluster resource; and determine output data based on the one or more second characteristics.

2. The system of claim 1, further comprising computer-executable instructions to:

determine one or more second characteristics of a second cluster resource;

generate third command data based on the first command data and the one or more second characteristics;

provide the third command data to the second cluster resource, wherein the third command data causes the second cluster resource to perform the function; and receive second telemetry data from the second cluster resource, wherein the second telemetry data indicates one or more third characteristics associated with performance of the function by the second cluster resource, and wherein the output data is further determined based on the one or more third characteristics.

3. The system of claim 1, further comprising computer-executable instructions to:

determine a first target state associated with the function;

determine a second target state that corresponds to the first target state and is associated with the first cluster resource;

determine, based on the first telemetry data, a first state of the first cluster resource after providing the second command data to the first cluster resource; and determine correspondence between the first state and the second target state, wherein the output data is further determined based on the correspondence.

4. The system of claim 1, further comprising computer-executable instructions to:

determine a first target state associated with the function;

determine a second target state that corresponds to the first target state and is associated with the first cluster resource;

before providing the second command data to the first cluster resource, determine a first state of the first cluster resource; and determine first correspondence between the first state and the second target state, wherein the second command data is provided to the first cluster resource in response to the first correspondence.

5. The system of claim 1, further comprising computer-executable instructions to:

determine a first target state associated with the function;

determine a second target state that corresponds to the first target state and is associated with the first cluster resource;

determine one or more intermediate states associated with the second target state;

determine, based on the first telemetry data, a first state of the first cluster resource after providing the second command data to the first cluster resource;

determine a first lack of correspondence between the first state and the second target state; and determine a second lack of correspondence between the first state and the one or more intermediate states;

based on one or more of the first lack of correspondence or the second lack of correspondence, one or more of:

include an indication of one or more of the first lack of correspondence or the second lack of correspondence in the output data; or provide third command data to the first cluster resource to cause the first cluster resource to one or more of: restart the function or return the first cluster resource to an initial state.

6. The system of claim 1, further comprising computer-executable instructions to:

determine a first target state associated with the function;

determine a second target state that corresponds to the first target state and is associated with the first cluster resource;

determine one or more intermediate states associated with the second target state;

determine, based on the first telemetry data, a first state of the first cluster resource after providing the second command data to the first cluster resource;

at a first time:

determine a lack of correspondence between the first state and the second target state; and determine first correspondence between the first state and the one or more intermediate states; and at a second time after the first time:

determine second correspondence between the first state and the second target state, wherein the output data is further determined based on the second correspondence.

7. The system of claim 1, further comprising computer-executable instructions to:

determine a first target state associated with the function;

determine a second target state that corresponds to the first target state and is associated with the first cluster resource;

determine a first intermediate state and a second intermediate state associated with the second target state, wherein the first intermediate state precedes the second intermediate state;

determine, based on the first telemetry data, a first state of the first cluster resource after providing the second command data to the first cluster resource;

at a first time:

determine first correspondence between the first state and the second intermediate state; and determine that second correspondence between a second state of the first cluster resource and the first intermediate state preceded the first correspondence; and at a second time after the first time:

determine third correspondence between the first state and the second target state, wherein the output data is further determined based on the third correspondence.

8. The system of claim 1, further comprising computer-executable instructions to:

determine a first target state associated with the function;

determine a second target state that corresponds to the first target state and is associated with the first cluster resource;

determine a first intermediate state and a second intermediate state associated with the second target state, wherein the first intermediate state precedes the second intermediate state;

determine, based on the first telemetry data, a first state of the first cluster resource after providing the second command data to the first cluster resource;

determine first correspondence between the first state and the second intermediate state;

determine that second correspondence between a second state of the first cluster resource and the first intermediate state did not precede the first correspondence; and based on the second correspondence between the second state and the first intermediate state not preceding the first state, one or more of:

include an indication of the second correspondence between the second state and the first intermediate state not preceding the first state in the output data; or provide third command data to the first cluster resource to cause the first cluster resource to one or more of: restart the function or return the first cluster resource to an initial state.

9. The system of claim 1, further comprising computer-executable instructions to:

determine a source of the first command data;

determine permission data associated with the source, wherein the permission data indicates one or more of: at least one function or at least one cluster resource; and determine one or more of:

first correspondence between the permission data and the first cluster resource; or second correspondence between the permission data and the function;

wherein the second command data is generated in response to the one or more of the first correspondence or the second correspondence.

10. A system comprising:

one or more memories storing computer-executable instructions; and one or more hardware processors to execute the computer-executable instructions to:

determine first command data indicative of a first target state;

determine a second target state of a first cluster resource that corresponds to the first target state;

provide one or more of the first command data or second command data based on the first command data to the first cluster resource, wherein the one or more of the first command data or the second command data causes the first cluster resource to perform a function;

receive first telemetry data from the first cluster resource, wherein the first telemetry data indicates a first state of the first cluster resource after providing the one or more of the first command data or the second command data to the first cluster resource;

determine first correspondence between the first state and the second target state; and determine output data based on the first correspondence between the first state and the second target state.

11. The system of claim 10, further comprising computer-executable instructions to:

before providing the one or more of the first command data or the second command data to the first cluster resource, determine a second state of the first cluster resource; and determine second correspondence between the second state and the second target state, wherein the one or more of the first command data or the second command data is provided to the first cluster resource in response to the second correspondence.

12. The system of claim 10, further comprising computer-executable instructions to:

determine one or more intermediate states associated with one or more of the first cluster resource, the first target state, the second target state, or the function;

before determining the first state, determine a second state of the first cluster resource;

determine a lack of correspondence between the second state and the one or more intermediate states; and based on the lack of correspondence, one or more of:

include an indication of the lack of correspondence in the output data; or provide third command data to the first cluster resource to cause the first cluster resource to one or more of: restart the function or return the first cluster resource to an initial state.

13. The system of claim 10, further comprising computer-executable instructions to:

determine one or more intermediate states associated with one or more of the first cluster resource, the first target state, the second target state, or the function;

before determining the first state, determine a second state of the first cluster resource; and determine second correspondence between the second state and the one or more intermediate states, wherein the first correspondence is determined after determining the second correspondence.

14. The system of claim 10, further comprising computer-executable instructions to:

determine a first intermediate state and a second intermediate state associated with the second target state, wherein the first intermediate state precedes the second intermediate state;

determine, based on the first telemetry data, a second state of the first cluster resource after providing the one or more of the first command data or the second command data to the first cluster resource;

at a first time:

determine second correspondence between the second state and the second intermediate state; and determine that third correspondence between a third state of the first cluster resource and the first intermediate state preceded the first correspondence;

wherein the first correspondence between the first state and the second target state is determined at a second time after the first time.

15. The system of claim 10, further comprising computer-executable instructions to:

determine a first intermediate state and a second intermediate state associated with the second target state, wherein the first intermediate state precedes the second intermediate state;

determine, based on the first telemetry data, a second state of the first cluster resource after providing the one or more of the first command data or the second command data to the first cluster resource;

determine second correspondence between the first state and the second intermediate state;

determine that third correspondence between a third state of the first cluster resource and the first intermediate state did not precede the second correspondence; and based on the third correspondence between the second state and the first intermediate state not preceding the second state, one or more of:

include an indication of the third correspondence between the second state and the first intermediate state not preceding the second third state in the output data; or provide third command data to the first cluster resource to cause the first cluster resource to one or more of: restart the function or return the first cluster resource to an initial state.

16. The system of claim 10, further comprising computer-executable instructions to:

determine a third target state of a second cluster resource that corresponds to the first target state;

provide one or more of the first command data or third command data based on the first command data to the second cluster resource, wherein the one or more of the first command data or the third command data causes the second cluster resource to perform the function;

receive second telemetry data from the second cluster resource, wherein the second telemetry data indicates a second state of the second cluster resource after providing the one or more of the first command data or the third command data to the second cluster resource; and determine second correspondence between the second state and the third target state, wherein the output data is further based on the second correspondence.

17. A computer-implemented method comprising:

determining first command data indicative of a function;

determining one or more first characteristics of a first cluster resource;

determining second command data based on the first command data and the one or more first characteristics;

providing the second command data to the first cluster resource, wherein the second command data causes the first cluster resource to perform the function;

receiving first telemetry data from the first cluster resource, wherein the first telemetry data indicates one or more second characteristics associated with performance of the function by the first cluster resource; and determining output data based on the one or more second characteristics.

18. The method of claim 17, further comprising:

determining a first state associated with the function;

determining one or more second states that correspond to the first state and are associated with the first cluster resource;

determining a third state of the first cluster resource based on the first telemetry data; and determining correspondence between the third state and the one or more second states, wherein the output data is further determined based on the correspondence between the third state and the one or more second states.

19. The method of claim 17, further comprising:

determining permission data associated with a source of the first command data, wherein the permission data indicates one or more of: at least one function or at least one cluster resource; and determining one or more of:

first correspondence between the first cluster resource and the permission data; or second correspondence between the function and the permission data;

wherein the second command data is determined in response to the one or more of the first correspondence or the second correspondence.

20. The method of claim 17, further comprising:

determining one or more third characteristics of a second cluster resource;

determining third command data based on the first command data and the one or more third characteristics;

providing the third command data to the second cluster resource, wherein the third command data causes the second cluster resource to perform the function; and receiving second telemetry data from the second cluster resource, wherein the second telemetry data indicates one or more fourth characteristics associated with performance of the function by the second cluster resource, wherein the output data is further determined based on the one or more fourth characteristics.

* * * * *